US010863107B2

(12) United States Patent
Watanabe et al.

(10) Patent No.: US 10,863,107 B2
(45) Date of Patent: Dec. 8, 2020

(54) IMAGE SENSOR CONFIGURED BY IMAGING MODULE INSTALLED IN BODY MODULE AND LENS MODULE, AND CAPABLE OF PERFORMING GOOD SHADING CORRECTION

(71) Applicant: OMRON Corporation, Kyoto (JP)

(72) Inventors: Kosuke Watanabe, Kusatsu (JP);
Yasuhito Uetsuji, Kusatsu (JP)

(73) Assignee: OMRON Corporation, Kyoto (JP)

( * ) Notice: Subject to any disclaimer, the term of this patent is extended or adjusted under 35 U.S.C. 154(b) by 46 days.

(21) Appl. No.: 16/188,300

(22) Filed: Nov. 13, 2018

(65) Prior Publication Data

US 2019/0268549 A1    Aug. 29, 2019

(30) Foreign Application Priority Data

Feb. 23, 2018    (JP) .................................. 2018-031119

(51) Int. Cl.
*H04N 5/243* (2006.01)
*H04N 5/235* (2006.01)
(Continued)

(52) U.S. Cl.
CPC ........... *H04N 5/243* (2013.01); *H04N 5/2253* (2013.01); *H04N 5/2351* (2013.01);
(Continued)

(58) Field of Classification Search
CPC .. H04N 5/243; H04N 5/23209; H04N 5/3572; H04N 5/2253; H04N 5/2351;
(Continued)

(56) References Cited

U.S. PATENT DOCUMENTS

2006/0147200 A1*  7/2006  Arimoto ................ G03B 17/14
                                                              396/529
2007/0268371 A1   11/2007  Misawa et al.
(Continued)

FOREIGN PATENT DOCUMENTS

CN    101971610    2/2011
CN    102103304    6/2011
(Continued)

OTHER PUBLICATIONS

"Search Report of Europe Counterpart Application", dated Apr. 11, 2019, p. 1-p. 9.
(Continued)

*Primary Examiner* — Lin Ye
*Assistant Examiner* — Chan T Nguyen
(74) *Attorney, Agent, or Firm* — JCIPRNET

(57) ABSTRACT

The image sensor includes a body module, and a lens module and an imaging module installed in the body module. The body module includes: a correction part performing shading correction on image data outputted by the imaging module installed in the body module according to the set shading correction information; an acquisition part acquiring information related to a size of an imaging element in the imaging module installed in the body module and acquiring light amount ratio information representing a ratio of a light amount at least two positions on an imaging surface of the imaging element from the lens module installed in the body module; and a generation and setting part generating shading correction information based on the information acquired by the acquisition part and setting the shading correction information to the correction part.

20 Claims, 13 Drawing Sheets

(51) Int. Cl.
  *H04N 5/232*    (2006.01)
  *H04N 5/357*    (2011.01)
  *H04N 5/225*    (2006.01)
  *H04N 9/04*     (2006.01)

(52) U.S. Cl.
  CPC ....... *H04N 5/23209* (2013.01); *H04N 5/3572* (2013.01); *H04N 5/2252* (2013.01); *H04N 5/2254* (2013.01); *H04N 9/04517* (2018.08)

(58) Field of Classification Search
  CPC ............. H04N 9/04517; H04N 5/2252; H04N 5/2254; H04N 5/23212; H04N 5/2353
  USPC ..................................................... 348/222.1
  See application file for complete search history.

(56) References Cited

U.S. PATENT DOCUMENTS

| | | | |
|---|---|---|---|
| 2009/0002526 A1* | 1/2009 | Koishi | H04N 5/23209 348/241 |
| 2011/0102668 A1* | 5/2011 | Kaga | G03B 17/14 348/374 |
| 2011/0205383 A1* | 8/2011 | Shah | H04N 5/23219 348/222.1 |

FOREIGN PATENT DOCUMENTS

| | | |
|---|---|---|
| EP | 1227669 | 7/2002 |
| EP | 1981285 | 10/2008 |
| JP | 2007-214682 | 8/2007 |

OTHER PUBLICATIONS

"Office Action of China Counterpart Application", dated Jun. 18, 2020, with English translation thereof, pp. 1-14.

\* cited by examiner

| Zoom setting value | x1.0 | x1.1 | x1.2 | ... | x7.8 | x7.9 | x8.0 |
|---|---|---|---|---|---|---|---|
| Exit pupil position | 20.0mm | 20.1mm | 20.2mm | ... | 25.0mm | 25.1mm | 25.2mm |
| Exit pupil diameter | 10.0mm | 9.9mm | 9.8mm | ... | 9.5mm | 9.5mm | 9.4mm |

| Aperture setting value | F2.0 | F2.1 | F2.2 | ... | F15.8 | F15.9 | F16 |
|---|---|---|---|---|---|---|---|
| Exit pupil reduction rate | x0.707 | x0.690 | x0.674 | ... | x0.252 | x0.251 | x0.250 |

| x coordinate | 1 | 2 | | 319 | 320 | 321 | | 639 | 640 |
|---|---|---|---|---|---|---|---|---|---|
| Correction gain | x2.01 | x1.90 | | x1.02 | x1.00 | x1.02 | | x1.90 | x2.00 |
| y coordinate | 1 | 2 | | 239 | 240 | 241 | | 479 | 480 |
| Correction gain | x1.71 | x1.69 | | x1.02 | x1.00 | x1.02 | | x1.69 | x1.70 |

| Format information | Pixel size | Number of pixels in the X direction | Number of pixels in the Y direction | Incident angle characteristic information ||||
|---|---|---|---|---|---|---|---|
| | | | | Incident angle 45° | ... | Incident angle 1° | Incident angle 0° |
| CM1 | 3.45 μm | 640 | 480 | 50 | ... | 98 | 100 |
| CM2 | 3.45 μm | 1280 | 1024 | 60 | ... | 99 | 100 |
| | | | | | | | |
| CMm | 5.5 μm | 1280 | 1024 | 50 | ... | 98 | 100 |

FIG. 16

| Format | Zoom setting value | x1.0 | x1.1 | x1.2 | ... | x7.9 | x8.0 |
|---|---|---|---|---|---|---|---|
| LM1 | Exit pupil position | 20.0mm | 20.1mm | 20.2mm | ... | 25.1mm | 25.2mm |
| | Exit pupil diameter | 10.0mm | 9.9mm | 9.8mm | ... | 9.5mm | 9.4mm |
| LM2 | Exit pupil position | 15.0mm | 15.1mm | 15.2mm | ... | 18.1mm | 18.2mm |
| | Exit pupil diameter | 9.0mm | 8.9mm | 8.8mm | ... | 8.5mm | 8.4mm |

FIG. 17

| Format | Aperture setting value | F2.0 | F2.1 | F2.2 | ... | F15.8 | F15.9 | F16 |
|---|---|---|---|---|---|---|---|---|
| LM1 | | x0.707 | x0.690 | x0.674 | ... | x0.252 | x0.251 | x0.250 |
| LM2 | | x0.700 | x0.685 | x0.660 | ... | x0.255 | x0.254 | x0.252 |

FIG. 18

IMAGE SENSOR CONFIGURED BY IMAGING MODULE INSTALLED IN BODY MODULE AND LENS MODULE, AND CAPABLE OF PERFORMING GOOD SHADING CORRECTION

CROSS-REFERENCE TO RELATED APPLICATION

This application claims the priority benefit of Japan Patent Application No. 2018-031119, filed on Feb. 23, 2018. The entirety of the above-mentioned patent application is hereby incorporated by reference herein and made a part of this specification.

BACKGROUND

Technical Field

The disclosure relates to a modular image sensor constituted by a combination of multiple modules.

Description of Related Art

In the production line of a factory, a system called image sensor is frequently used for automating the inspection and management of products and saving labor. In the past, the configuration that connects a camera and an image processing device with a cable is common (see Japanese Laid-open No. 2007-214682), but recently a processing-integrated image sensor has also been launched which integrates the camera and the image processing device so as to perform from imaging to image processing with a single device. Such a processing-integrated image sensor is also called a "smart camera" and may be formed by integrating illuminations and lenses.

The angle of view desired for the smart camera and the resolution of the imaging result (image data) differ depending on the size of the object to be inspected, the environment where the image sensor is installed, etc. Therefore, makers who provide smart cameras have lined up a large number of products with different specifications such as angles of view, for the user to select the one with the optimum specification.

However, as the IoT development of factories is accelerating, the range of application of smart cameras has expanded, and it is becoming difficult to provide product variations that cover the diverse user needs. Further, in order to be distinguished from the competitors in product competition, more mass customization and seasonal products are offered to meet the preference of each customer and the life cycle of the products of digital devices typified by smart phones is shortening, and there is an increasing need for partially changing the illuminations and lenses, etc. so that change of the object to be inspected enters a short cycle to be optimum for the inspection. Thus, it is conceivable to respectively modularize the optical system and the imaging element of the smart camera for the user to freely combine the optical system and the imaging element. However, since the contents of light amount ratio correction to be applied to the imaging result differ depending on the combination of the optical system and the imaging element, a smart camera for performing good light amount ratio correction on the imaging result cannot be realized by simply modularizing the smart camera regardless of the combination of the optical system and the imaging element that is being used.

SUMMARY

An image sensor according to an embodiment of the disclosure includes a body module, and a lens module and an imaging module installed in the body module. Then, the body module of the image sensor includes: a correction part, to which shading correction information is settable, performing shading correction on image data outputted by the imaging module installed in the body module according to the set shading correction information; an acquisition part acquiring information related to a size of an imaging element in the imaging module installed in the body module and acquiring light amount ratio information representing a ratio of a light amount at least two positions on an imaging surface of the imaging element from the lens module installed in the body module; and a generation and setting part generating shading correction information for correcting shading that occurs in the image data due to the ratio of the light amount based on the information acquired by the acquisition part and setting the shading correction information to the correction part.

BRIEF DESCRIPTION OF THE DRAWINGS

FIG. 16 is an explanatory diagram showing a configuration embodiment of the imaging element information table.

FIG. 17 is an explanatory diagram showing a configuration embodiment of the exit pupil information table.

FIG. 18 is an explanatory diagram showing a configuration embodiment of the pupil diameter reduction rate table.

DESCRIPTION OF THE EMBODIMENTS

Figure 1:
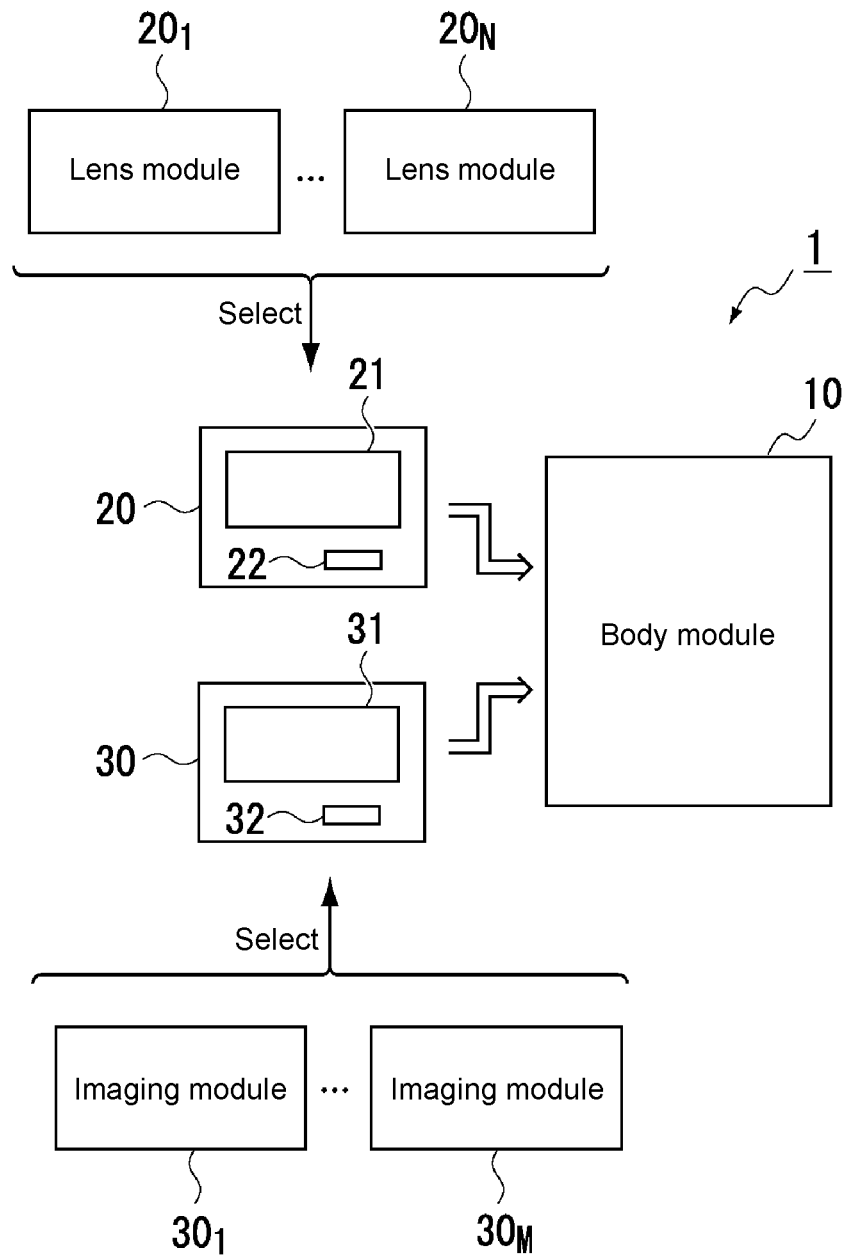
FIG. 1 is an explanatory diagram showing a schematic configuration of the image sensor according to the first embodiment.

The disclosure has been made in view of the above and aims to provide an image sensor that is configured by a body module and a lens module and an imaging module installed in the body module, and is capable of performing good light amount ratio correction on the imaging result regardless of the combination of the lens module and the imaging module that is being used.

By adopting the above configuration for the image sensor, it is possible to apply shading correction of a content corresponding to the combination of the lens module and the imaging module installed in the body module to the imaging result (image data from the imaging module). Therefore, it is possible to obtain image data with good shading correction with any combination of the lens module and the imaging module installed in the body module.

By using the "light amount ratio information representing a ratio of a light amount at least two positions on an imaging surface of the imaging element from the lens module installed in the body module" acquired by the acquisition part of the body module together with the information related to the imaging element, the information may be in any format if it can generate the shading correction information. Moreover, a part of "acquiring the light amount ratio information associated with a current aperture setting value when the lens module installed in the body module is a second type lens module with adjustable aperture" may be adopted as the acquisition part of the body module. By adopting the acquisition part that operates in this manner, it is possible to obtain an image sensor that suppresses excessive shading (luminance unevenness) irrespective of the adjustment made to the aperture.

The acquisition part may acquire the light amount ratio information from anywhere. For example, a memory storing the light amount ratio information for each aperture setting value may be installed in the second type lens module, and when the lens module installed in the body module is the second type lens module, a part for acquiring the light amount ratio information associated with the current aperture setting value from the memory in the second type lens module may be adopted as the acquisition part.

In addition, the image sensor may have a configuration that "the second type lens module is zoomable, the light amount ratio information is stored for each combination of the aperture setting value and a zoom setting value in the memory of the second type lens module, and the acquisition part of the body module acquires the light amount ratio information associated with a combination of the current aperture setting value and a current zoom setting value from the memory of the second type lens module installed in the body module". By adopting this configuration, it is possible to obtain an image sensor that suppresses excessive shading irrespective of the adjustment made to the aperture and zoom magnification of the second type lens module.

"Information related to the imaging element in the imaging module" (hereinafter referred to as imaging element information) acquired by the acquisition part of the image sensor may be information that can be combined with the light amount ratio information to generate the light amount ratio correction information. Therefore, the pixel size and the number of pixels of the imaging element can be used as the imaging element information. In addition, if the imaging elements in the imaging modules have the same pixel size, the number of pixels of the imaging element may be used solely as the imaging element information, and if the imaging elements in the imaging modules have the same number of pixels, the pixel size of the imaging element may be used solely as the imaging element information.

Further, when the lens module installed in the body module is zoomable, the acquisition part of the body module may acquire the light amount ratio information corresponding to a current zoom setting value. The light amount ratio information corresponding to the current zoom setting value may be stored in the memory in the lens module or may be information held by another device.

In addition, the method by which the acquisition part of the image sensor acquires the information related to the size of the imaging element is not particularly limited. For example, a part for acquiring the information related to the size of the imaging element from the memory in the imaging module may be adopted as the acquisition part. Besides, a part for acquiring format information of the imaging module or the imaging element from the memory in the imaging module and acquiring information related to the size of the imaging element associated with the format information from another storage device may be adopted as the acquisition part. In addition, the information related to the size of the imaging element may include at least two of the pixel size, the number of pixels, and the element size of the imaging element.

According to the disclosure, it is possible to provide an image sensor that is capable of performing good shading correction on the imaging result regardless of the combination of the lens module and the imaging module that is being used.

Embodiments of the disclosure will be described below with reference to the drawings.

First Embodiment

Figure 2:
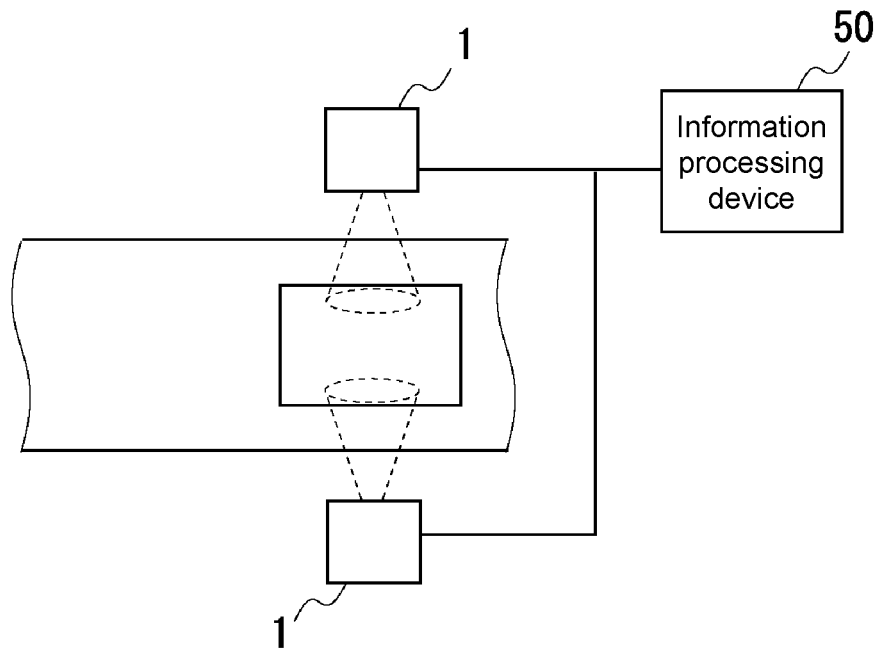
FIG. 2 is an explanatory diagram showing an embodiment of use of the image sensor.

FIG. 1 shows a schematic configuration of an image sensor 1 according to the present embodiment, and FIG. 2 shows an embodiment of use of the image sensor 1.

As shown in FIG. 1, the image sensor 1 of the present embodiment is a device configured by installing a lens module 20 and an imaging module 30 in a body module 10. Moreover, as shown in FIG. 2, the image sensor 1 is developed based on the assumption that it is in a form to be provided at several places of a production line, etc., and is used in a form that the processing result of each image sensor 1 is collected by one information processing device 50.

The imaging module 30 (FIG. 1) is a module including an imaging element 31 such as a CMOS image sensor and a CCD image sensor. M types of imaging modules $30_1$ to $30_M$ having different specifications (pixel size, incident angle characteristic, etc. of the imaging element 31) are prepared as the imaging module 30 for the image sensor 1. A non-volatile memory 32 (the purposes will be described later) such as a serial EEPROM is provided in each imaging module 30.

The lens module 20 is a module including an optical system 21 for imaging the light from an object to be imaged onto an imaging surface of the imaging element 31. N types of lens modules $20_1$ to $20_N$ having different specifications are prepared as the lens module 20, and a non-volatile memory 22 (the purposes will be described later) such as a serial EEPROM is provided in each lens module 20.

The body module 10 is a module that applies shading correction on the image data from the imaging module 30 and analyzes the image data after shading correction to perform various processes (such as processing of reading barcodes, etc., processing of determining presence/absence of abnormality, etc.).

Hereinafter, the configuration and operation of the image sensor 1 according to the present embodiment will be described more specifically. In the following description, the lens module is also referred to as LM.

First, the information stored in the non-volatile memory 32 of each imaging module 30 and the non-volatile memory 22 of each lens module 20 will be described.

Incident angle characteristic information representing an incident angle characteristic of the imaging element 31 in the imaging module 30, the pixel size, the number of pixels in the X direction, and the number of pixels in the Y direction of the imaging element 31 are stored in the non-volatile memory 32 of each imaging module 30 for the image sensor 1. Here, the number of pixels in the X direction is the number of pixels in the longitudinal direction of the imaging element 31, and the number of pixels in the Y direction is the number of pixels of the imaging element 31 in the direction orthogonal to the X direction. The incident angle characteristic information stored in the non-volatile memory 32 usually includes information representing the incident angle characteristic in the X direction and information representing the incident angle characteristic in the Y direction. However, if the incident angle characteristic in the X direction substantially matches the incident angle characteristic in the Y direction, the incident angle characteristic information may be information representing only the incident angle characteristic in the X direction.

Figures 3A, 3B:
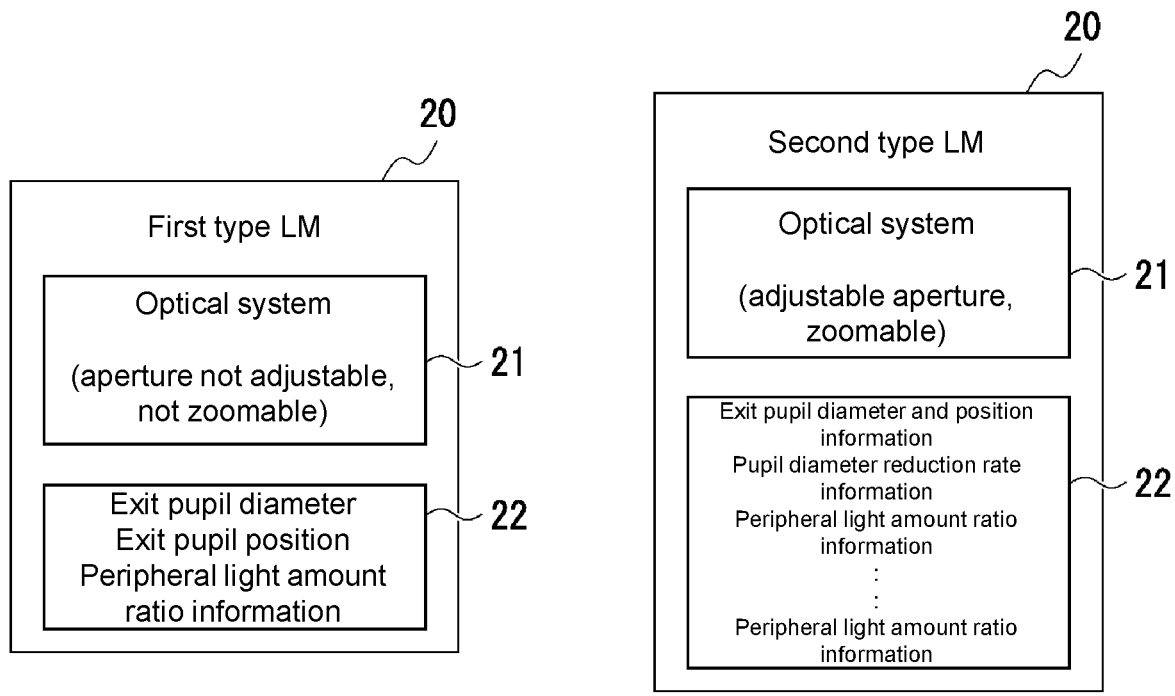
FIG. 3A and FIG. 3B are explanatory diagrams of the first type lens module and the second type lens module.

Further, as shown in FIG. 3A and FIG. 3B, the lens modules 20 for the image sensor 1 include a first type LM 20 and a second type LM 20, wherein the first type LM 20 includes an optical system 21 that does not have adjustable aperture and is not zoomable, and the second type LM 20 includes an optical system 21 that has an adjustable aperture and is zoomable. Then, the non-volatile memory 22 of each first type LM 20 stores the entrance pupil diameter, the entrance pupil position, and the peripheral light amount ratio information of the optical system 21 in the module. In addition, the non-volatile memory 22 of each second type LM 20 stores the exit pupil diameter and position information, the pupil diameter reduction rate information, and a plurality of pieces of peripheral light amount ratio information.

Each information on the non-volatile memory 22 of the second type LM 20 will be described below. The exit pupil diameter and position information is information indicating the relationship between the zoom setting value (setting value of the zoom magnification) of the LM and the exit pupil diameter and the exit pupil position. That is, when the zoom setting value (for example, zoom setting values α and β) is changed, as shown schematically in FIG. 4, the diameter and position of the exit pupil change. The exit pupil diameter and position information is information indicating the relationship between the zoom setting value and the exit pupil diameter and the exit pupil position. The information of the configuration (data structure) shown in FIG. 5, for example, is used as the exit pupil diameter and position information.

Figures 6, 7:
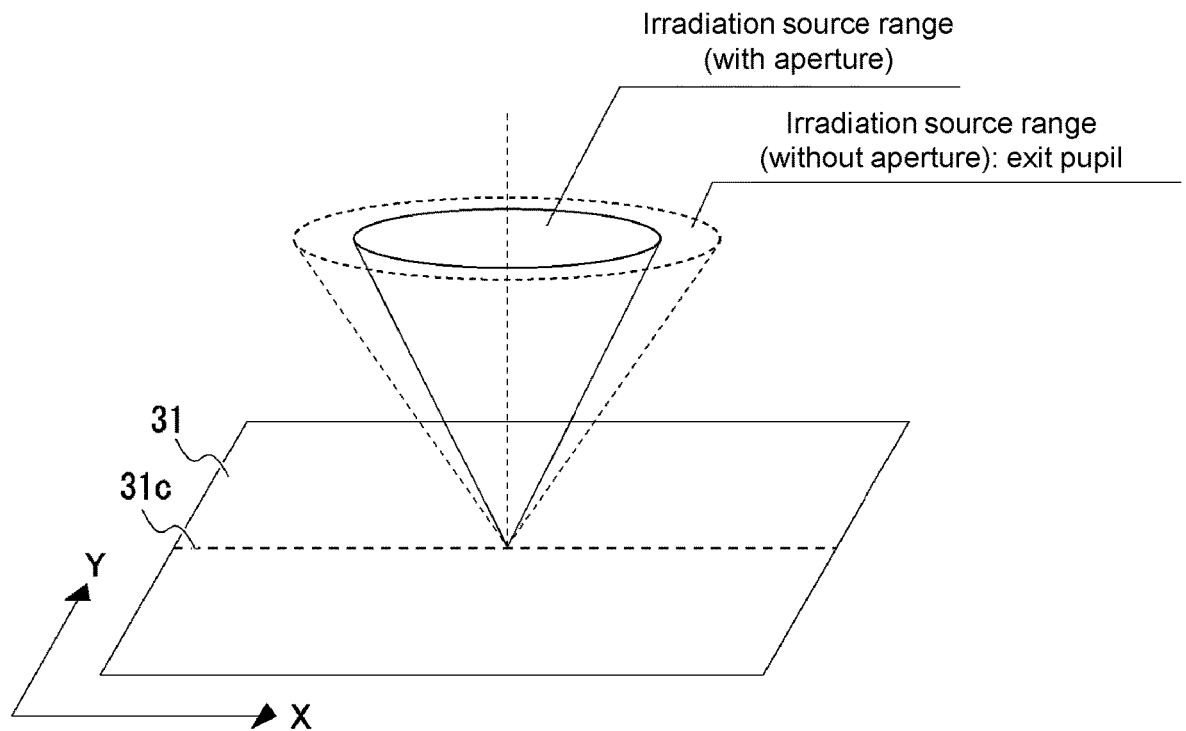
FIG. 6 is an explanatory diagram of the pupil diameter reduction rate information.
FIG. 7 is an explanatory diagram showing a configuration embodiment of the pupil diameter reduction rate information.

In addition, when the value of the aperture of the second type LM 20 is changed, as schematically shown in FIG. 6, the diameter of the irradiation source range of the light to the imaging element 31 decreases according to the aperture setting value (F value). The pupil diameter reduction rate information is information indicating the relationship between the aperture setting value (setting value of the F value) and "diameter of the actual irradiation source range"/ "diameter of the irradiation source range without the aperture (that is, exit pupil)" (hereinafter referred to as exit pupil reduction rate). The information of the configuration shown in FIG. 7, for example, is used as the pupil diameter reduction rate information.

Each peripheral light amount ratio information on the non-volatile memory 22 of the second type LM 20 is information indicating the peripheral light amount ratio of the optical system 21 in the LM. Each peripheral light amount ratio information on the non-volatile memory 22 is associated with one or more combinations of the zoom setting value and the aperture setting value. The peripheral light amount ratio information associated with a certain combination of the zoom setting value and the aperture setting value on the non-volatile memory 22 indicates the peripheral light amount ratio of the optical system 21 when setting according to the combination has been made.

Next, the configuration and function of the body module 10 will be described.

Figure 8:
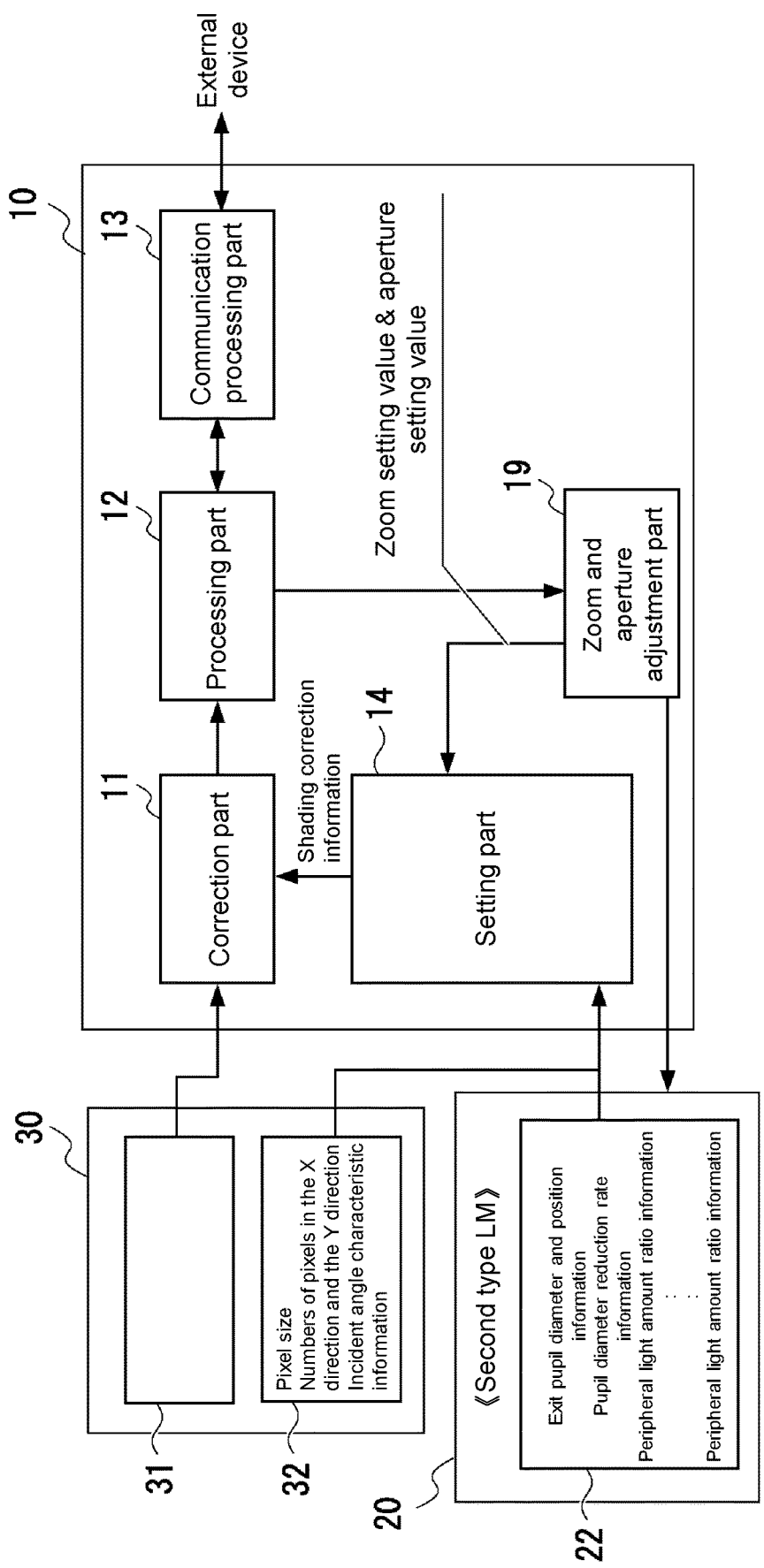
FIG. 8 is a functional block diagram of the body module of the image sensor according to the first embodiment.

FIG. 8 shows a functional block diagram of the body module 10. As shown in the figure, the body module 10 includes a correction part 11, a processing part 12, a communication processing part 13, a setting part 14, and a zoom and aperture adjustment part 19. The correction part 11 of the body module 10 is realized by, for example, an image processing IC (FPGA, ASIC, etc.), and the communication processing part 13 is realized by, for example, a network interface circuit. In addition, the processing part 12, the setting part 14, and the zoom and aperture adjustment part 19 are realized by, for example, a microcontroller storing programs for the image sensor 1.

The correction part 11 is a unit that applies shading correction of a content defined by the set shading correction information on the image data from the imaging module 30. For example, a unit having the configuration shown in FIG. 10, in which shading correction information having the configuration shown in FIG. 9 is set, is used as the correction part 11.

The shading correction information (FIG. 9) is shading correction information for the imaging module 30 that includes the imaging element 31 having 640×480 pixels. As shown in the figure, the shading correction information includes X direction correction information (the information in the upper part of FIG. 9) that defines the correction gain to be multiplied by the luminance value of each pixel whose y coordinate is 240 for each x coordinate, and Y direction correction information (the information in the lower part of FIG. 9) that defines the correction gain to be multiplied by the luminance value of each pixel whose x coordinate is 320 for each y coordinate.

Figures 9, 10:
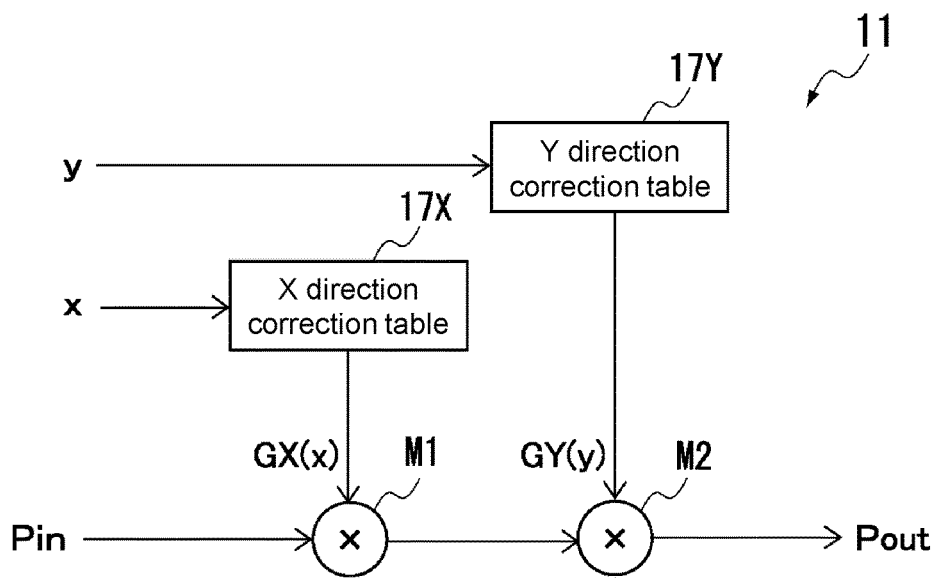
FIG. 9 is an explanatory diagram showing an embodiment of the shading correction information.
FIG. 10 is a functional block diagram of the correction part in the body module.

The X direction correction table 17X and the Y direction correction table 17Y included in the correction part 11 (FIG. 10) are tables (so-called lookup tables) for setting the X direction correction information and the Y direction correction information in the shading correction information (FIG. 9). A multiplier M1 is a unit that multiplies the correction gain GX(x) associated with the coordinate x in the X direction correction information by the luminance value Pin of the pixel at the coordinates x, y. A multiplier M2 is a unit that multiplies the correction gain GY(y) associated with the coordinate y in the Y direction correction information by the output of the multiplier M1 and outputs it as a processing result Pout.

Returning to FIG. 8, description of the body module 10 will be continued hereinafter. The processing part 12 is a unit that analyzes the image data after shading correction to perform various processes (such as processing of reading codes, processing of determining presence/absence of abnormality, etc.). The communication processing part 13 is a unit that the processing part 12 uses for communicating with an external device (information processing device 50).

The zoom and aperture adjustment part 19 is a unit that performs zoom setting and aperture setting of the second type LM 20. The zoom and aperture adjustment part 19 has a function of notifying the setting part 14 of the current (after change) zoom setting value and aperture setting value when the settings of zoom/aperture are changed, and a function of notifying the setting part 14 of the current zoom setting value and aperture setting value in response to a predetermined request from the setting part 14.

The setting part 14 is a unit that generates shading correction information for the correction part 11 to perform shading correction suitable for the image data from the imaging module 30 when it is installed in the body module 10, and sets the shading correction information to the correction part 11.

Specifically, when the body module 10 is powered on, the setting part 14 reads specification information (the pixel size, the number of pixels in the X direction, the number of pixels in the Y direction, and the incident angle characteristic information) of the imaging element 31 in the imaging module 30 from the non-volatile memory 32 of the imaging module 30 installed in the body module 10. Further, the setting part 14 determines whether the installed LM 20 is the second type LM 20 or the first type LM 20 by determining whether the exit pupil diameter and position information, etc. has been stored in the non-volatile memory 22 of the lens module 20 installed in the body module 10 (hereinafter referred to as the installed LM 20).

If the installed LM 20 is the first type LM 20, the setting part 14 reads the exit pupil diameter, the exit pupil position, and the peripheral light amount ratio information from the non-volatile memory 22 of the installed LM 20 (the first type LM 20). On the other hand, if the installed LM 20 is the second type LM 20, the setting part 14 acquires the current zoom setting value (hereinafter referred to as the current zoom setting value) and the current aperture setting value (hereinafter referred to as the current aperture setting value) of the installed LM 20 from the zoom and aperture adjustment part 19.

Next, the setting part 14 reads the exit pupil diameter and the exit pupil position associated with the current zoom setting value and the exit pupil reduction rate associated with the current aperture setting value from the non-volatile memory 22 of the installed LM 20 (the second type LM 20). More specifically, the setting part 14 reads the exit pupil diameter and the exit pupil position associated with the current zoom setting value from the exit pupil diameter and position information (see FIG. 5) on the non-volatile memory 22, and reads the exit pupil reduction rate associated with the current aperture setting value from the exit pupil diameter and position information (see FIG. 7) on the non-volatile memory 22.

The setting part 14 also reads the peripheral light amount ratio information associated with the combination of the current zoom setting value and the current aperture setting value from the non-volatile memory 22 of the installed LM 20 (the second type LM 20).

In short, the setting part 14 collects the exit pupil diameter, the exit pupil position, and the peripheral light amount ratio information as information related to the installed LM 20 (optical system 21) when the installed LM 20 is the first type LM 20. Moreover, the setting part 14 collects the exit pupil diameter, the exit pupil position, the peripheral light amount ratio information, and the exit pupil reduction rate as information related to the installed LM 20 when the installed LM 20 is the second type LM 20.

Figure 11:
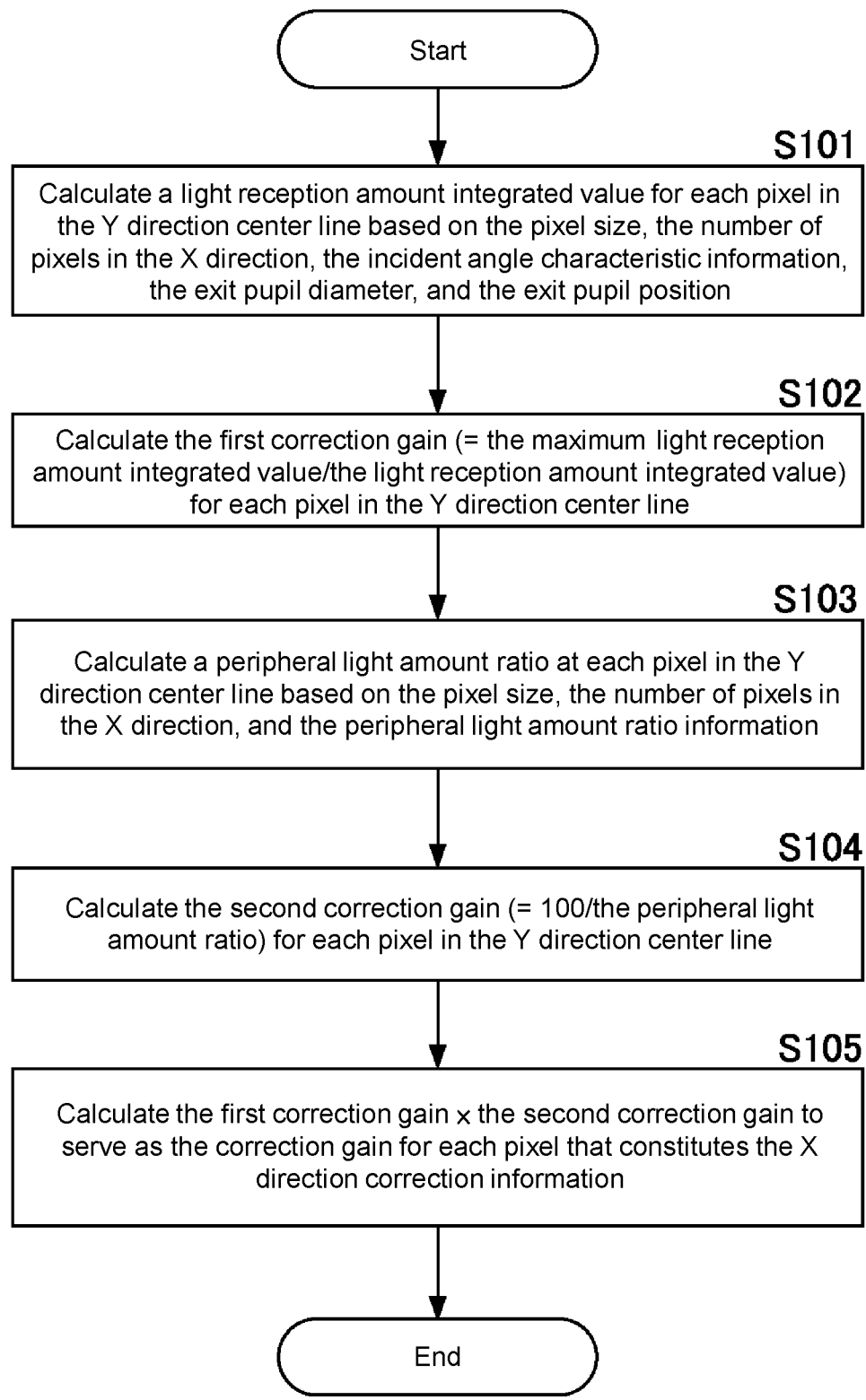
FIG. 11 is a flowchart of the X direction correction information generation process executed by the body module of the image sensor according to the first embodiment.

Then, the setting part 14 generates the X direction correction information by an X direction correction information generation process in the procedure shown in FIG. 11 when the installed LM 20 is the first type LM 20. As already described above, the X direction correction information is element information of shading correction information (see the information in the upper part of FIG. 9).

That is, when the X direction correction information is generated, the setting part 14 first calculates a light reception amount integrated value for each pixel in the Y direction center line of the imaging element 31 based on the collected information group (the pixel size, the number of pixels in the X direction, the incident angle characteristic information, the exit pupil diameter, and the exit pupil position) (step S101).

Figure 12A:
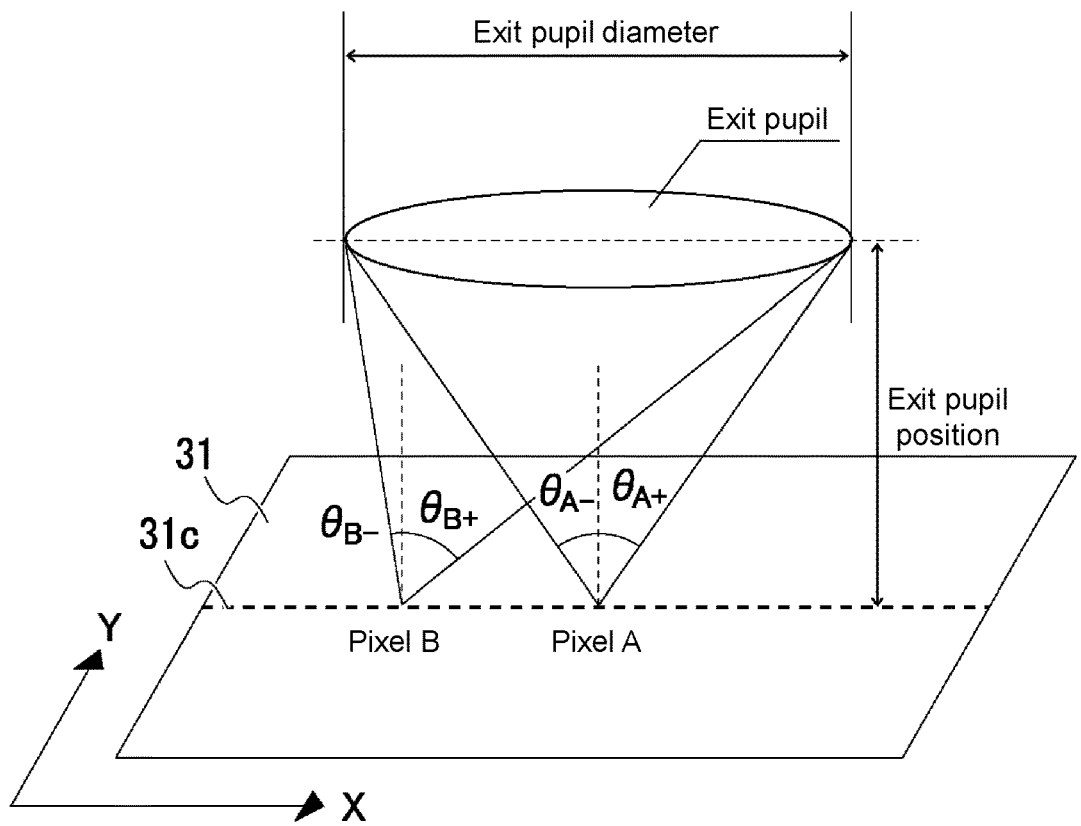
FIG. 12A is a diagram for illustrating the content of the processing in step S101 of the X direction correction information generation process.
Figure 12B:
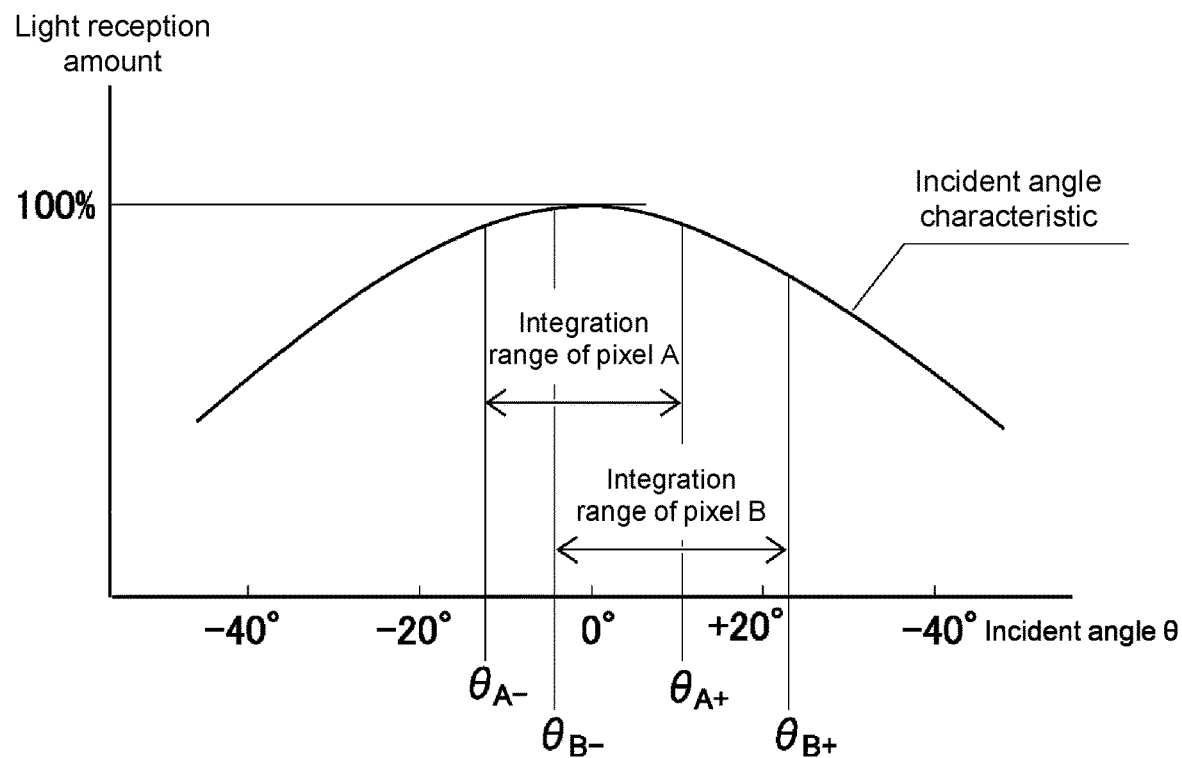
FIG. 12B is a diagram for illustrating the content of the processing in step S101 of the X direction correction information generation process.

Here, the Y direction center line is a pixel group 31c positioned in the center of the imaging element 31 in the Y direction, as shown in FIG. 12A. In step S101, the setting part 14 specifies the incident angle range (for example, incident angle range $\theta_{A-} \sim \theta_{A+}$ and incident angle range $\theta_{B-} \sim \theta_{B+}$) to each pixel (for example, pixels A and B) in the Y direction center line based on the pixel size, the number of pixels in the X direction, the exit pupil diameter, and the exit pupil position (see FIG. 12A). Then, as shown in FIG. 12B, the setting part 14 integrates the light reception amount in the incident angle range to each pixel in the Y direction center line, indicated by the incident angle characteristic information, to calculate the light reception amount integrated value for each pixel.

Figure 13:
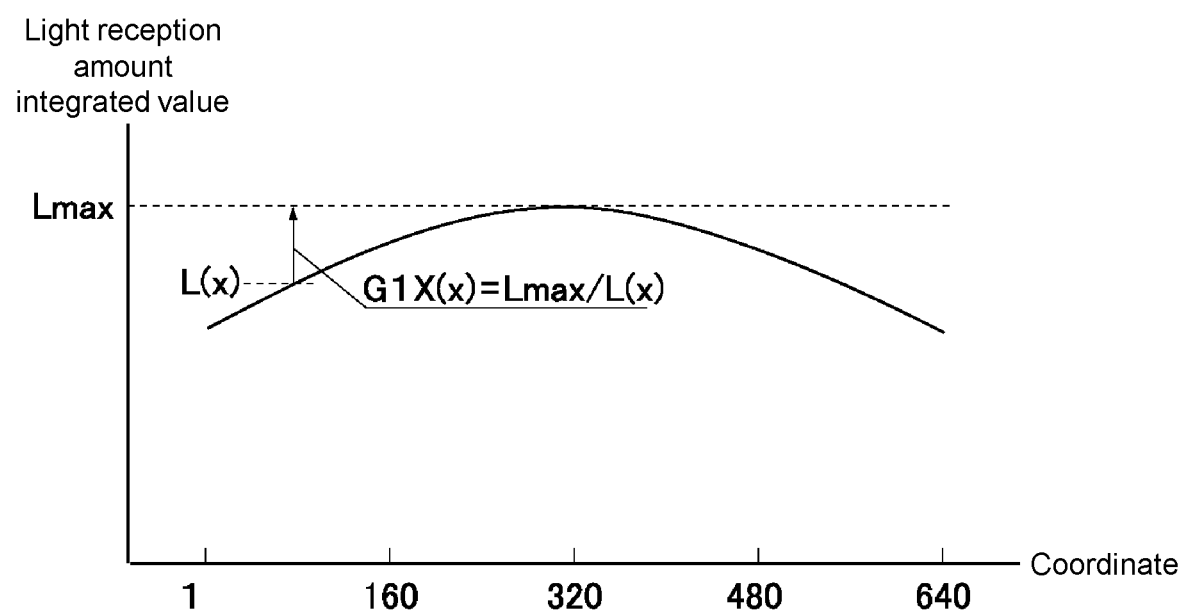
FIG. 13 is a diagram for illustrating the content of step S102 of the X direction correction information generation process.

The setting part 14 that has finished the process of step S101 calculates a value by dividing the maximum light reception amount integrated value by the light reception amount integrated value of each pixel, to serve as the first correction gain for each pixel that constitutes the X direction correction information (step S102). That is, as schematically shown in FIG. 13, the setting part 14 calculates the maximum light reception amount integrated value Lmax/the light reception amount integrated value L(x), to serve as the first correction gain G1X(x) for each pixel in the Y direction center line.

Figure 14:
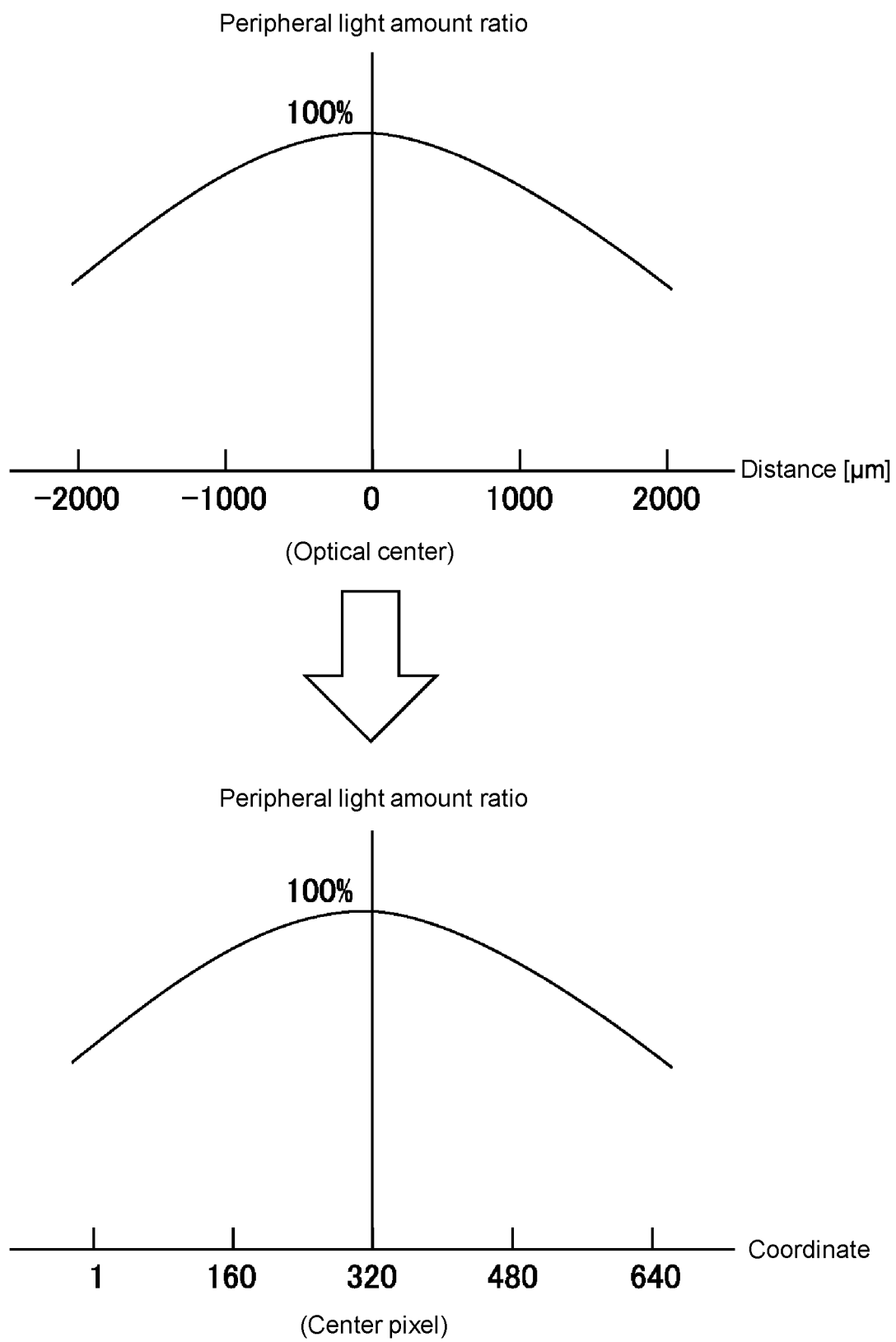
FIG. 14 is a diagram for illustrating the content of step S103 of the X direction correction information generation process.

Next, the setting part 14 calculates a peripheral light amount ratio at each pixel in the Y direction center line based on the pixel size, the number of pixels in the X direction, and the peripheral light amount ratio information (step S103). As schematically shown in FIG. 14, the process of this step S103 is a process of calculating the peripheral light amount ratio (the unit is %) at each pixel in the Y direction center line from the peripheral light amount ratio information which represents the relationship between the distance from the optical center and the peripheral light amount ratio.

The setting part 14 that has finished the process of step S103 calculates the second correction gain with respect to each pixel in the Y direction center line by calculating 100/"the peripheral light amount ratio of each pixel" (step S104). Then, the setting part 14 calculates the correction gain for each pixel that constitutes the X direction correction information by calculating the first correction gain×the second correction gain for each pixel (step S105).

The setting part 14 also generates the Y direction correction information in the same procedure. If the incident angle characteristic in the X direction and the incident angle characteristic in the Y direction of the imaging element 31 substantially match each other, the Y direction correction information may be generated by extracting a part of the X direction correction information (information corresponding to the number of pixels in the Y direction at the center) instead of the procedure as described above.

The setting part 14 generates shading correction information in the above procedure when the installed LM 20 is the first type LM 20.

When the installed LM 20 is the second type LM 20, the setting part 14 also generates the shading correction information in the same procedure. In this case, however, the diameter of the irradiation source range of the light to the imaging element 31 is smaller than the exit pupil diameter due to the aperture (see FIG. 6), and the pupil diameter reduction rate read from the pupil diameter reduction rate information (FIG. 7) indicates the ratio. Therefore, the setting part 14 is configured so that, when the installed LM 20 is the second type LM 20, the setting part 14 generates shading correction information in the form of handling the value, which is obtained by multiplying the exit pupil diameter read from the exit pupil diameter and position information (FIG. 5) by the pupil diameter reduction rate read from the pupil diameter reduction rate information (FIG. 7), as the "exit pupil diameter" in the above X direction correction information generation process.

The setting part 14 also generates shading correction information in the same procedure when the zoom setting value and the aperture setting value that have changed are notified from the zoom and aperture adjustment part 19, and sets the shading correction information to the correction part 11.

As described above, in the image sensor 1 according to the present embodiment, the shading correction information of the content suitable for the combination of the modules being used is generated based on the peripheral light amount ratio of the optical system 21 in the lens module 20, the incident angle characteristic of the imaging element 31 in the imaging module 30, etc., and shading correction is performed on the image data from the imaging module 30 according to the shading correction information. Thus, according to the image sensor 1, image data with good shading correction can be obtained with any combination of the lens module 20 and the imaging module 30 installed in the body module 10.

Second Embodiment

Hereinafter, the configuration and operation of the image sensor 1 according to the second embodiment will be described focusing on the portions different from the image sensor 1 according to the first embodiment using the same reference numerals as those in the description of the image sensor 1 according to the first embodiment. For convenience of explanation, in the following description, the image sensor 1 according to the $L^{th}$ (L=1, 2) embodiment and the body module 10 of the image sensor 1 according to the $L^{th}$ embodiment are also denoted as the $L^{th}$ image sensor 1 and the $L^{th}$ body module 10.

Figure 15:
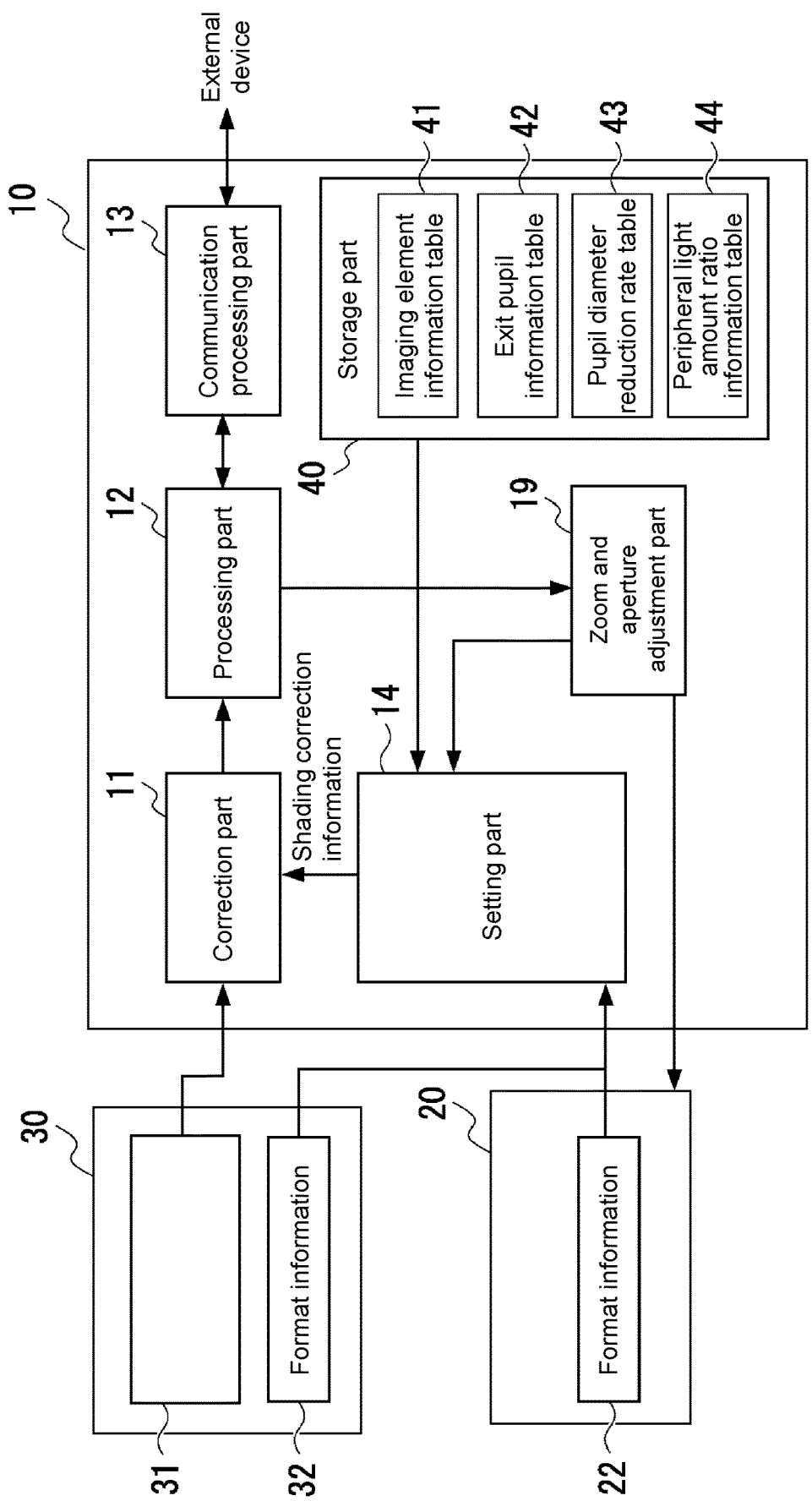
FIG. 15 is a functional block diagram of the body module of the image sensor according to the second embodiment.

FIG. 15 shows a schematic configuration of the second image sensor 1 (the image sensor 1 according to the second embodiment).

The second image sensor 1 is a device in which lens modules 20 and imaging modules 30 of various specifications are prepared as available modules, like the first image sensor 1. In addition, the lens modules 20 for the second image sensor 1 include the first type LM 20 and the second type LM 20, like the first image sensor 1.

However, as shown in the figure, the non-volatile memory 22 of each lens module 20 for the second image sensor 1 stores format information indicating the format of the lens module 20. Besides, the non-volatile memory 32 of each imaging module 30 for the second image sensor 1 stores format information indicating the format of the imaging module 30.

In the second body module 10 (the body module 10 of the second image sensor 1), a storage part 40 is provided for storing an imaging element information table 41, an exit pupil information table 42, a pupil diameter reduction rate table 43, and a peripheral light amount ratio information table 44.

FIG. 16, FIG. 17, and FIG. 18 respectively show configuration embodiments of the imaging element information table 41, the exit pupil information table 42, and the pupil diameter reduction rate table 43. As shown in FIG. 16, the imaging element information table 41 is a table that stores the pixel size of the imaging element 31 in each imaging module 30, the number of pixels in the X direction, the number of pixels in the Y direction, and the incident angle characteristic information in a form associated with the format information of each imaging module 30.

The exit pupil information table 42 (FIG. 17) is a table that stores information indicating the relationship between the zoom setting value and the exit pupil diameter and the exit pupil position with respect to the second type LM 20 and the exit pupil diameter and the exit pupil position with respect to the first type LM 20 in a form associated with the format information of each lens module 20. The pupil diameter reduction rate table 43 (FIG. 18) is a table that stores information indicating the relationship between the aperture setting value (setting value of the F value) of each second type LM 20 and the exit pupil reduction rate in a form associated with the format information of each second type LM 20.

The peripheral light amount ratio information table 44 (FIG. 15) is a table that stores the peripheral light amount ratio information indicating the peripheral light amount ratio of the optical system 21 in the case where setting according to the combination has been made for each combination of the zoom setting value and the aperture setting value with respect to the second type LM 20, and stores the peripheral light amount ratio information indicating the peripheral light amount ratio of the optical system 21 in the first type LM 20 with respect to the first type LM 20 in a form associated with the format information of each LM 20.

That is, the same information as that stored in the non-volatile memory 22 of each lens module 20 for the first image sensor 1 is stored in the storage part 40 of the second body module 10 for each format information. Further, the same information as that stored in the non-volatile memory 32 of each imaging module 30 for the first image sensor 1 is stored in the storage part 40 for each format information.

Then, the setting part 14 of the second body module 10 is formed by modifying the setting part 14 of the first body module 10, so as to collect from the storage part 40 information necessary for generating the shading correction information based on the format information (hereinafter referred to as LM format information) on the non-volatile memory 22 of the lens module 20 and the format information (hereinafter referred to as CM format information) on the non-volatile memory 32 of the imaging module 30.

Figures 4, 5:
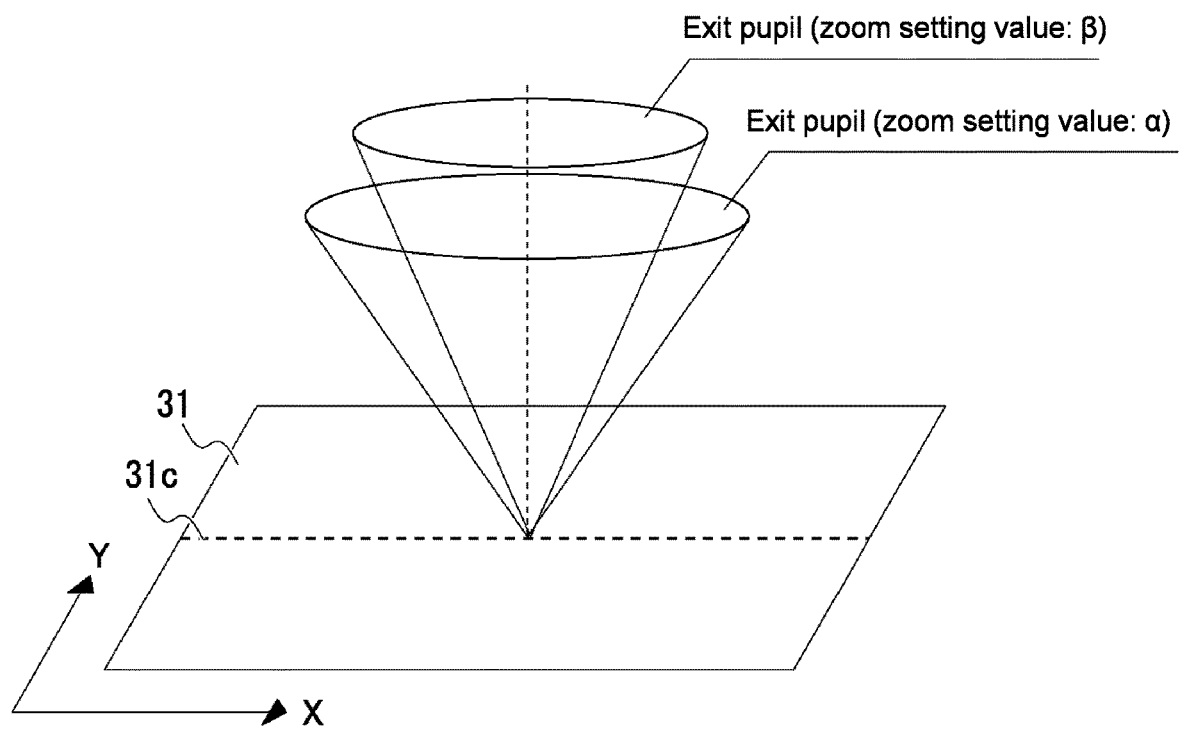
FIG. 4 is an explanatory diagram of the exit pupil diameter and position information.
FIG. 5 is an explanatory diagram showing a configuration embodiment of the exit pupil diameter and position information.

Specifically, the setting part 14 of the second body module 10 acquires the LM format information from the non-volatile memory 22 of the lens module 20 and acquires the CM format information from the non-volatile memory 32 of the imaging module 30 when the second body module 10 is powered on. Thereafter, the setting part 14 reads information (pixel size, etc.) associated with the acquired CM format information from the imaging element information table 41 (FIG. 5). Further, the setting part 14 determines whether the installed LM 20 (the lens module 20 installed in the second body module 10) is the second type LM 20 based on the acquired LM format information.

When the installed LM 20 is the first type LM 20, the setting part 14 reads the exit pupil diameter and the exit pupil position associated with the LM format information from the exit pupil information table 42, and reads the peripheral light amount ratio information associated with the LM format information from the peripheral light amount ratio information table 44.

On the other hand, when the installed LM 20 is the second type LM 20, the setting part 14 acquires the current zoom setting value (hereinafter referred to as current zoom setting value) and the current aperture setting value (hereinafter referred to as the current aperture setting value) of the installed LM 20 (the second type LM 20) from the zoom and aperture adjustment part 19. Then, the setting part 14 reads the exit pupil diameter and the exit pupil position associated with the current zoom setting value from the exit pupil information table 42 and reads the exit pupil reduction rate associated with the current aperture setting value from the pupil diameter reduction rate table 43. Moreover, the setting part 14 also reads the peripheral light amount ratio information associated with the LM format information, the current zoom setting value, and the current aperture setting value from the peripheral light amount ratio information table 44.

The setting part 14 that collects various information in this manner generates shading correction information in the same procedure as the setting part 14 in the first body module 10 based on the collected information. Then, the setting part 14 sets the generated shading correction information to the correction part 11.

As described above, the image sensor 1 according to the present embodiment also has the configuration that the shading correction information of the content suitable for the combination of the modules being used is generated based on the peripheral light amount ratio of the optical system 21 in the lens module 20, the incident angle characteristic of the imaging element 31 in the imaging module 30, etc., and shading correction is performed on the image data from the imaging module 30 according to the shading correction information. Thus, with this image sensor 1, image data with good shading correction can also be obtained with any combination of the lens module 20 and the imaging module 30 installed in the body module 10.

Modified Embodiment

Various modifications may be made to the image sensor 1 according to each of the embodiments described above. For example, if the imaging element 31 in each imaging module 30 is an element that has less output incident angle dependence, the body module 10 of the image sensor 1 according to each embodiment can be modified to generate shading correction information for correcting the shading, which occurs in the image data due to drop of the peripheral light amount, without considering the incident angle characteristic of the imaging element 31. In addition, the image sensor 1 according to the second embodiment can be modified into a device in which information related to the imaging element 31 is stored in the non-volatile memory 32 of the imaging module 30.

The peripheral light amount ratio information may be set to have fewer light amount ratios included therein. Further, the peripheral light amount ratio information may be set to have fewer light amount ratios included therein and the light amount ratio at each position may be calculated by interpolation, etc. on the side of the body module 10.

By providing a unit corresponding to the correction part 11 on the side of the imaging module 30, the image sensor 1 according to each embodiment may be modified into a device for performing correction on the image data on the side of the imaging module 30.

An external device (information processing device 50, another image sensor 1, a storage on the Internet, etc.) that holds the imaging element information table 41, the exit pupil information table 42, the pupil diameter reduction rate table 43, and the peripheral light amount ratio information table 44 may be prepared, and the body module 10 of the image sensor 1 according to the second embodiment may be modified into a module that acquires information required for generating the shading correction information by accessing the external device.

Figure 19:
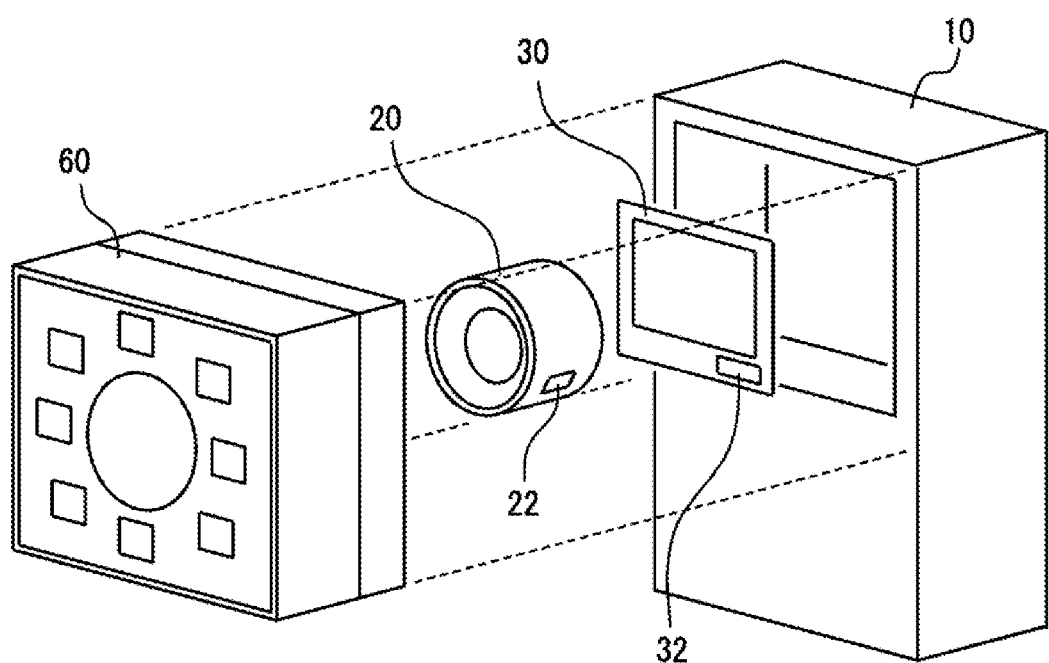
FIG. 19 is a diagram for illustrating a modified embodiment of the image sensor.

Further, the lens module 20 may be modified to include a light source (LED, etc.) for illuminating the subject. As schematically shown in FIG. 19, the body module 10 may be modified for installing an illumination module 60 that includes a light source for illuminating the subject. Of course, the image sensor 1 may be modified into a device including a lens module 20 that has an optical system 21, which has adjustable aperture but is not zoomable, as the constituent element, or the specific generation procedure of the shading correction information may not be the same as that described above. Regarding the forms in which the smart camera is provided (delivery forms), the modules may be provided separately to be assembled on the user side, or the smart camera may be provided with the illumination module and the lens module incorporated in the sensor body. In the case of the latter form, there is no need to adjust the optical conditions on the user side, so it has the advantage that the image sensor can be introduced more easily.

APPENDIX (1) An image sensor (1) comprising a body module (10), and a lens module (20) and an imaging module (30) installed in the body module (10), wherein the body module (10) comprises:

a correction part (11), to which shading correction information is settable, performing shading correction on image data outputted by the imaging module (30) installed in the body module (10) according to the set shading correction information;

a acquisition part (14) acquiring information related to a size of an imaging element in the imaging module (30) installed in the body module (10) and acquiring light amount ratio information representing a ratio of a light amount at least two positions on an imaging surface of the imaging element from the lens module (20) installed in the body module (10); and a generation and setting part (14) generating shading correction information for correcting shading that occurs in the image data due to the ratio of the light amount based on the information acquired by the acquisition part (14) and setting the shading correction information to the correction part (11).

What is claimed is:

1. An image sensor comprising a body module, and a lens module and an imaging module installed in the body module, wherein
the body module comprises:
a correction integrated circuit, to which shading correction information is settable, performing shading correction on image data outputted by the imaging module installed in the body module according to the set shading correction information;
an acquisition microcontroller acquiring information related to a size of an imaging element in the imaging module installed in the body module and acquiring light amount ratio information representing a ratio of a light amount at least two positions on an imaging surface of the imaging element from the lens module installed in the body module; and
a generation and setting microcontroller generating shading correction information for correcting shading that occurs in the image data due to the ratio of the light amount based on the information acquired by the acquisition microcontroller and setting the shading correction information to the correction integrated circuit, wherein
the lens module installed in the body module comprises a non-volatile memory, and
the generation and setting microcontroller determines a type of lens module installed in the body module by determining whether an exit pupil diameter and position information, a pupil diameter reduction rate information, and a plurality of pieces of peripheral light amount ratio information have been stored in the non-volatile memory of the lens module based on the information acquired by the acquisition microcontroller.

2. The image sensor according to claim 1, wherein when the lens module installed in the body module is a second type lens module with adjustable aperture, the acquisition microcontroller of the body module acquires the light amount ratio information associated with a current aperture setting value.

3. The image sensor according to claim 2, wherein the second type lens module comprises a memory that stores the light amount ratio information for each aperture setting value, and
when the lens module installed in the body module is the second type lens module, the acquisition microcontroller of the body module acquires the light amount ratio information associated with the current aperture setting value from the memory in the second type lens module.

4. The image sensor according to claim 2, wherein the second type lens module is zoomable,
the light amount ratio information is stored for each combination of an aperture setting value and a zoom setting value in the memory of the second type lens module, and
the acquisition microcontroller of the body module acquires the light amount ratio information associated with a combination of the current aperture setting value and a current zoom setting value from the memory of the second type lens module installed in the body module.

5. The image sensor according to claim 1, wherein when the lens module installed in the body module is zoomable, the acquisition microcontroller of the body module acquires the light amount ratio information corresponding to a current zoom setting value.

6. The image sensor according to claim 5, wherein the acquisition microcontroller of the body module acquires the light amount ratio information corresponding to the current zoom setting value from a memory of the lens module.

7. The image sensor according to claim 1, wherein the acquisition microcontroller acquires the information related to the size of the imaging element from a memory in the imaging module.

8. The image sensor according to claim 2, wherein the acquisition microcontroller acquires the information related to the size of the imaging element from a memory in the imaging module.

9. The image sensor according to claim 3, wherein the acquisition microcontroller acquires the information related to the size of the imaging element from a memory in the imaging module.

10. The image sensor according to claim 4, wherein the acquisition microcontroller acquires the information related to the size of the imaging element from a memory in the imaging module.

11. The image sensor according to claim 5, wherein the acquisition microcontroller acquires the information related to the size of the imaging element from a memory in the imaging module.

12. The image sensor according to claim 6, wherein the acquisition part microcontroller acquires the information related to the size of the imaging element from a memory in the imaging module.

13. The image sensor according to claim 1, wherein the information related to the size of the imaging element comprises at least two of a pixel size, the number of pixels, and an element size of the imaging element.

14. The image sensor according to claim 2, wherein the information related to the size of the imaging element comprises at least two of a pixel size, the number of pixels, and an element size of the imaging element.

15. The image sensor according to claim 3, wherein the information related to the size of the imaging element comprises at least two of a pixel size, the number of pixels, and an element size of the imaging element.

16. The image sensor according to claim 4, wherein the information related to the size of the imaging element comprises at least two of a pixel size, the number of pixels, and an element size of the imaging element.

17. The image sensor according to claim 5, wherein the information related to the size of the imaging element comprises at least two of a pixel size, the number of pixels, and an element size of the imaging element.

18. The image sensor according to claim 6, wherein the information related to the size of the imaging element comprises at least two of a pixel size, the number of pixels, and an element size of the imaging element.

19. The image sensor according to claim 7, wherein the information related to the size of the imaging element comprises at least two of a pixel size, the number of pixels, and an element size of the imaging element.

20. The image sensor according to claim 8, wherein the information related to the size of the imaging element comprises at least two of a pixel size, the number of pixels, and an element size of the imaging element.

* * * * *